Patented Jan. 30, 1945

2,368,199

UNITED STATES PATENT OFFICE 2,368,199

POLYHYDRIC ALCOHOLS OF STEROIDS AND A METHOD OF MAKING THE SAME

Adolf Butenandt, Berlin-Dahlem, and Willy Logemann, Berlin-Friedenau, Germany, assignors to Schering Corporation, Bloomfield, N. J., a corporation of New Jersey No Drawing. Application May 17, 1940, Serial No. 335,866. In Germany May 11, 1939

7 Claims. (Cl. 260—397.5)

This invention relates to polyhydric alcohols of steroids and a method of making the same.

According to U. S. application Ser. Nos. 153,002 and 213,630, polyhydric alcohols of steroids can be obtained by subjecting alkenylic compounds of steroids or compounds of this series having a double bond in the cyclopentan ring to the action of agents capable of adding two hydroxyl groups on a carbon to carbon double bond. Thereby glycol-like compounds are obtained. They may also be produced by adding oxygen to the starting material by means of agents capable of adding oxygen to a double bond, so as to form an oxide, and converting the oxides by means of hydrolyzing agents into the corresponding glycols. Especially suitable for this purpose is the use of osmium tetroxide, introduced in organic chemistry by Criegee. (Compare Annalen der Chemie, vol. 522, page 75 ff., 1936.)

When using this oxidizing agent on compounds having a hydroxyl group in 3-position and a double bond in the ring system in $\beta,\gamma$-position thereto, it was found that the $\beta,\gamma$-double bond in the ring is oxidized or hydroxylated to a considerable extent.

To prevent oxidation of the double bond in the case of the 3-hydroxyl compounds it is therefore advisable to protect the same intermediarily against the attack of the oxidizing agent by addition of halogen, halogen hydride or the like.

Now we have found that the protection of the double bond is not necessary if there is employed starting material, wherein the hydroxyl group is protected in a suitable manner, especially by acylation. This protection of the double bond by way of the protection of the hydroxyl group is probably caused by steric hindrance. The protection may also be carried out in other ways than by acylation with an organic acylating agent, for instance, by esterifying with inorganic acids, by etherifying, or generally by converting the hydroxyl group into a group, capable of being re-converted into the hydroxyl group in known manner. Hence, the special importance of the reaction according to this invention is to be seen in the possibility of transforming 3-hydroxyl steroid compounds, having two or more double bonds, into glycolic compounds, without having to protect the double bond in $\beta,\gamma$-position to the 3-hydroxyl group against the action of the oxidizing agents.

The reaction according to the invention is explained more in detail by the following examples, without, however, being limited thereto.

Example 1

4.3 grs. of $\Delta_{17,20}$-17-ethenyl-$\Delta_{5,6}$-androstadienol-3-acetate are dissolved in 80 ccs. of dry ether. A solution of 3.5 grs. of osmium tetroxide in 20 ccs. of ether is added thereto. The reaction solution shows very rapidly a dark brown color. After standing for 3 days at 20° C., the ether is distilled off in vacuum. The residue is then dissolved in 150 ccs. of alcohol, and for the decomposition of the osmium ester the solution is boiled with a solution of 22 grs. of sodium sulfite in 100 ccs. of water for 90 minutes. Precipitated osmium metal and sodium sulfate are filtered off and several times extracted with alcohol. The combined filtrates are poured into water. The precipitated reaction product is filtered off and dried. Thus, 4 grs. of a crude product of the melting point 200–220° C. are obtained. Apparently it represents a mixture of two stereo-isomeric trioles (the acetate group in 3-position, being saponified by sodium sulfite). By repeated recrystallisation one of the two isomeric $\Delta_5$-pregnentriols-(3,17,20) with the melting point 227° C. can be obtained which crystallizes in long needles from chloroform, in prisms from acetic acid ester, and in thin leaflets from alcohol. $(\alpha)_D^{20}=75°$.

For the isolation of the other isomeric pregnentriol 4 grs. of the crude triol mixture with the melting point 200–220° C. are kept over night at 20° C. in a mixture of 15 ccs. of pyridine and 15 ccs. of acetic acid anhydride. After pouring the solution into water, the precipitate formed is filtered off. On dissolving the same in aqueous acetone first 1.1 grs. of small needles of melting point 180° C. crystallize, which by recrystallisation from aqueous alcohol may be further purified. They represent $\Delta_{5,6}$-pregnentriol-3,17,20-diacetate-3,20 of a melting point of 182° C. and a specific optical rotation of $(\alpha)_D^{20}=-74°$.

From the mother liquor there crystallize long needles of melting point 148° C. (2.2 grs.). The melting point is increased by repeated recrystallisation to 152–153° C. This diacetate represents a $\Delta_{5,6}$-pregnentriol-3,17,20-diacetate-3,20 stereoisomeric to the above mentioned product and having a specific optical rotation of $(\alpha)_D^{20}=-36°$.

Example 2

0.36 gr. of $\Delta_{5,20}$-pregnadiendiole-(3,17)-monoacetate-(3) are dissolved in 25 ccs. of ether and mixed with 0.28 gr. of osmium tetroxide. After two days the solution is evaporated to dryness and the residue is boiled for two hours with an aqueous alcoholic sodium sulfite solution (3 grs. of sodium sulfite, 30 ccs. of alcohol and 60 ccs.

of water). The black precipitate is then filtered off by suction and extracted with hot alcohol. The combined filtrates are concentrated in vacuum and extracted with ether several times. The ether residue is recrystallized from acetic acid ester. The mixture of isomers obtained melts at 215–220° C. By repeated recrystallisation from acetic acid ester a tetrahydroxy pregnen of M. P. 229–231° C. may be obtained in pure form.

*Example 3*

600 mgs. of 3-acetoxy-Δ5-Δ16-androstadiene, obtained by splitting off hydrochloric acid from 17-chloro-3-acetoxy-Δ5-androstene, obtained as by-product by chlorinating 3-acetoxy-17-hydroxy-Δ5-androstene, are dissolved in 20 ccs. of absolute ether and mixed with 600 mgs. osmium tetroxide. The solution is then allowed to stand for 3 days at room-temperature while excluding atmospheric moisture. Thereby a dark black sludge precipitates. After working up the reaction mixture in the usual manner by heating with alcoholic hyposulfite solution the alcoholic solution is diluted with water, saturated with sodium chloride and then exhaustively extracted with chloroform. The dried chloroform extract is carefully concentrated by evaporation in vacuum, traces of alcohol are removed by repeated distillation with benzene in vacuum, the residue is then dissolved in benzene and exhaustively washed through a column of 12 grs. of aluminum oxide. Thereby the remaining starting material as well as 17-chloride, admixed in traces, pass into the filtrate. The 16,17-diol formed is extracted thoroughly from the aluminum oxide by washing with benzene, to which 3 vol.-per cent of absolute alcohol are added. By evaporation a clear oily non-crystallizing mixture of isomeric 3-acetoxy-Δ5-16,17-dioxy-androstene is obtained.

Of course, many changes and variations in the reaction conditions, the starting materials employed, the solvents used, the methods of working up the reaction mixture and of separating the various isomers from each other, the reaction temperature and duration, and so forth may be made by those skilled in the art in accordance with the principles set forth herein and in the claim annexed hereto.

What we claim is:

1. Process for the manufacture of polyhydric alcohols of steroids, comprising subjecting an unsaturated steroid compound having at least two double bonds in its molecule an in 3-position a group convertible into a hydroxyl group, one of the double bonds being in β,γ-position to the 3-substituent, to the action of osmium tetroxide.

2. Process according to claim 1, comprising employing a Δ5,6-steroid compound containing at least one further double bond in its molecule, as starting material.

3. Process according to claim 1, comprising employing a Δ5,6-pregnan compound containing at least one further double bond in its molecule, as starting material.

4. Process according to claim 1, comprising employing a 3-acyloxy-Δ5,6-pregnan compound containing at least one further double bond in its molecule, as starting material.

5. Process according to claim 1, comprising employing a compound of the following formula

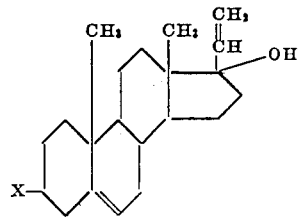

wherein X represents a group convertible into a hydroxy group with the aid of hydrolysis, as starting material.

6. Process according to claim 1, comprising employing a compound of the following formula

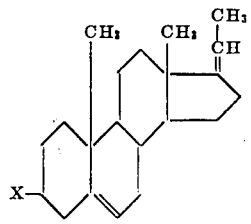

wherein X represents a group convertible into a hydroxy group with the aid of hydrolysis, as starting material.

7. Process according to claim 1, comprising employing a compound of the following formula

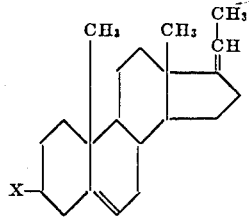

wherein X represents an ester group, as starting material.

ADOLF BUTENANDT.
WILLY LOGEMANN.